Oct. 6, 1942.  J. G. CAMPBELL  2,297,939
METHOD OF DETECTING THE PENETRATION OF AN OIL-BEARING HORIZON
Filed Oct. 9, 1940
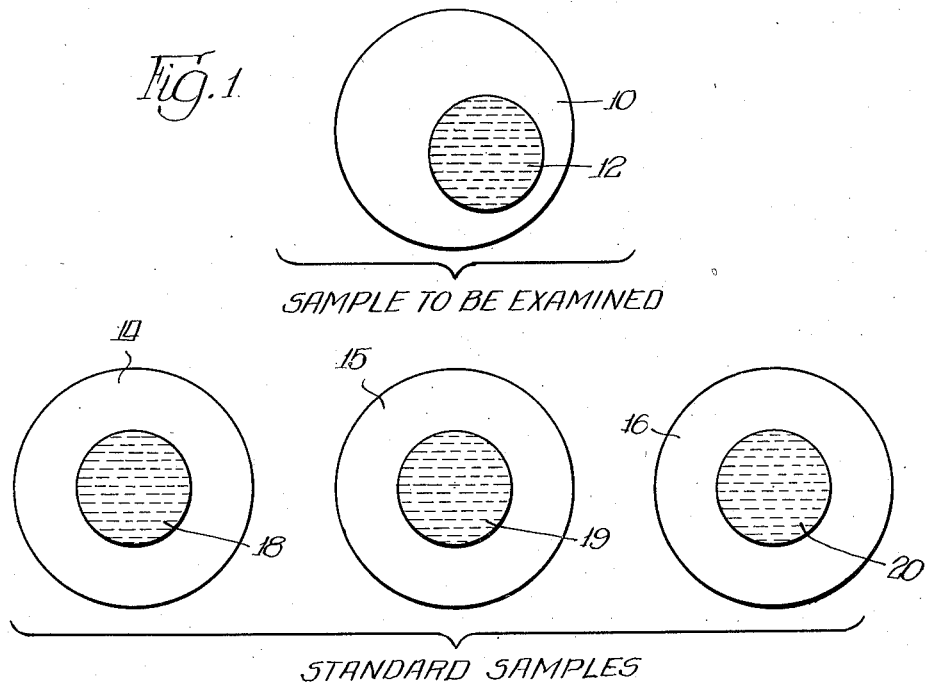
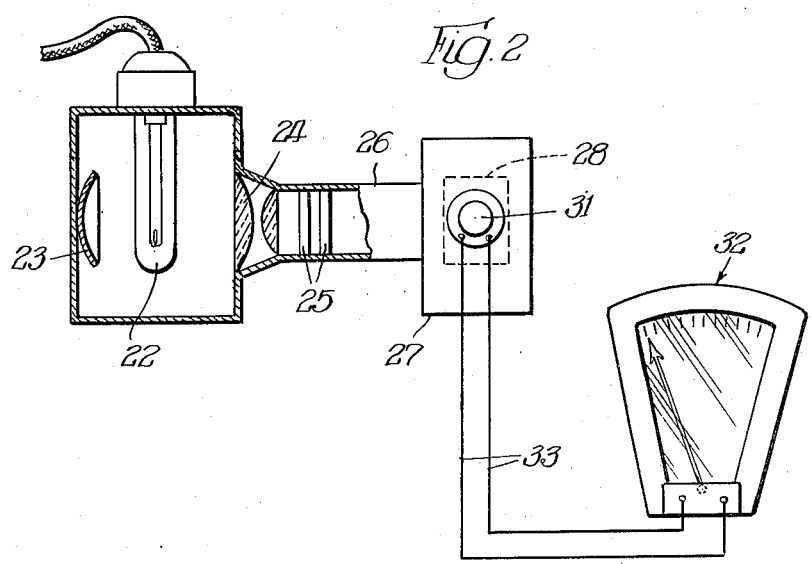
INVENTOR.
John G. Campbell.

Patented Oct. 6, 1942

2,297,939

UNITED STATES PATENT OFFICE 2,297,939

METHOD OF DETECTING THE PENETRATION OF AN OIL-BEARING HORIZON

John G. Campbell, Houston, Tex., assignor to Ralph H. Fash, trustee, Fort Worth, Tex.

Application October 9, 1940, Serial No. 360,405

3 Claims. (Cl. 250—71)

The invention relates to a method for use in exploring for oil and has more particular reference to an improved method for detecting the penetration of an oil-bearing horizon during the drilling of a well by analysis of the solid content of the drilling fluid.

In the process of drilling for oil, difficulty is encountered in determining whether an horizon that has been penetrated contains sufficient oil to justify the expense of testing. Due to this uncertainty, productive horizons have occasionally been passed up and the oil which could be produced from these horizons is lost.

In my copending application Serial No. 360,404, filed October 9, 1940, I disclose and claim a method of detecting the penetration of an oil-bearing horizon by the application of ultra-violet light to the drilling fluid entering the well and to the drilling fluid leaving the well. The fluids are subjected to ultra-violet light to cause the oil content thereof to fluoresce, it being understood that the fluorescent effect produced under ultra-violet light will vary in intensity in proportion to the oil content. The penetration of an oil-bearing horizon is indicated by observing the difference in intensity of the fluorescence of the two fluids and noting an increase in the fluorescence of the fluid discharged from the well.

An object of the present invention resides in the improved method of determining the difference in the oil content of the entering and discharged drilling fluids in a manner which will eliminate any possibility of error on account of penetrating horizons carrying minerals other than oil which give a fluorescent effect when subjected to the action of ultra-violet light.

A number of minerals are present in the earth other than oil which will produce a fluorescence under the action of ultra-violet rays. These minerals, if encountered during the drilling of a well, will become incorporated in the drilling fluid and the same will be carried to the surface with the drilling fluid. Therefore, in determining the oil content of the drilling fluid by observing the fluorescent effect on the same under ultra-violet light, there is a possibility of error owing to the presence in the drilling fluid of material other than oil capable of fluorescing. The present method consists in the quantitative determination of the oil in the relatively dry solid residue of the drilling fluid, following evaporation of the fluid, by observing the fluorescent effect produced by the oil content thereof under ultra-violet light, as previously described.

Accordingly, another and more specific object of the invention resides in a method, based on the evaporation of the drilling fluid to dryness and the analysis of the solid residue by improved means whereby the oil content of the same is extracted and subjected to ultra-violet light to produce the desired fluorescent effect for determining the quantity of oil in the sample analyzed.

The present method requires that a comparison be made between the oil content of the drilling fluid discharged from the well and the oil content of the drilling fluid entering the well, the said determination being made on the substantially dry solid residue of the fluid in each instance in order to discount any possibility of error by reason of the fluids carrying minerals in suspension such as give a fluorescent effect under ultra-violet light.

With these and various other objects in view, the invention may consist of certain novel steps in procedure and operation as will be more fully described and particularly pointed out in the specification, drawing and claims appended hereto.

In the drawing, wherein like reference characters are used to designate like parts—

Figure 1 is a plan view illustrating a manner of camparing under ultra-violet light a spot of unknown oil concentration with standard spots of known oil concentration; and Figure 2 is a side elevational view schematically illustrating an instrument for subjecting a solution of unknown oil concentration to ultra-violet light for comparison.

The following procedure may be considered as illustrative of one method coming under the invention: A sample of the drilling fluid entering the well, for example, approximately 40 ccs. in quantity, is placed in a screw capped jar of suitable capacity for retaining the sample, and the jar and contents are then subjected for a short period of time to centrifugal action in order to cause a separation of the coarse material from the drilling fluid. The centrifugal force used should be approximately the same for any given length of time in order to obtain comparable results between the sample analyzed of the drilling fluid entering the well and the sample of the drilling fluid discharged from the well. About 5 ccs. of the uniform dispersed phase of centrifuged fluid are placed in a tared dish and evaporated to dryness to determine the solid content of the said dispersed phase. This weighed residue is then placed in a screw capped jar together with approximately 30 ccs. of an oil solvent, such as ethyl ether, benzol, petroleum ether, and agitated for about one hour. The jar and contents are then subjected to the action of centrifugal force for about one minute or for a duration of time sufficient to obtain a clear layer of the ethyl ether or other oil solvent used. By this extraction process, most of the oil originally contained in the dried solid residue is extracted by the ethyl ether.

A convenient aliquot of the extract containing the oil is measured and for carrying out the method of the invention as illustrated by Figure 1 of the drawing, the same is transferred quantitatively to fluorescent-free filter paper, identified by numeral 10, or any other fluorescent-free absorbent paper. Any non-fluorescent surface may be used on which to form a spot of the extract, as indicated by numeral 12, but an absorbent one is preferred on account of speed and ease of handling. This step should be carefully performed, the object being to obtain a spot on the filter paper of uniform size with other spots to be compared therewith, so that the results will vary as little as possible. The transfer can be made quite rapidly and easily, using a dropping pipette where the dropping can be controlled, resulting in a spot of uniform size.

For comparison, a set of standard samples of crude petroleum oil is prepared of known concentration, ranging approximately from 0.1 milligram to 1.0 milligram. These are made up in convenient strength stock solutions, using the same type of solvent, and transferring to discs 14, 15, 16, etc., or the like, of fluorescent-free absorbent material, or other non-fluorescent surface, to form standard spots 18, 19 and 20, respectively, in the same precise manner as for spot 12 of the extract. It will be understood that as regards spot 12 the oil content of the extract from which said spot is obtained is unknown, whereas, the oil content of the spots 18, 19 and 20 is known. The discs may be arranged as shown in Figure 1 of the drawing, and, in accordance with the invention, the same are subjected to ultra-violet light in a room free of visible light to produce a fluorescence of the oil content of said spots. A comparison is then made of the fluorescence of spot 12 with the fluorescence of the standard spots 18, 19 and 20, having a known oil content. Since the fluorescence of the solutions will vary in intensity in direct proportion to the oil content thereof, it is possible to record the quantity of oil in spot 12 as that of the standard spot having approximately the same fluorescence. Due to the fading effect of continued or prolonged ultra-violet ray exposure on oil, it is necessary to renew the standards at regular intervals to maintain precision and accuracy in this method.

Referring to Figure 2 of the drawing, the instrument which has been schematically illustrated may consist of any of the standard devices on the market for measuring the fluorescence of liquids and solids. In this modification of the invention approximately 10 ccs. of the extract containing the oil extracted from the solid residue is placed in a quartz cuvette 28 of said instrument and the intensity of the fluorescence measured. The exciting light source 22 may comprise a mercury capillary arc. Behind the lamp is a reflector 23 and in front a condensing lens system 24. The filters 25 permit passage of the ultra-violet light but filter out all significant visible rays. The metal tube 26 allows passage of the exciting light to the cuvette 28 located within housing 27, one side of which can be removed for the introduction or withdrawal of the cuvette. In operation of the instrument, fluorescent light from the extract will pass through special filters 30 to the photo-electric cell 31 connected in circuit with the galvanometer 32, either directly by wires 33, as shown in the drawing, or indirectly through a switch control panel, not shown. The fluorescent light that strikes the photo-electric cell 31 allows a current to flow to the galvanometer proportional to the intensity of said fluorescent light. The reading on the galvanometer can be converted into terms of oil by comparing the fluorescence produced by known amounts of crude petroleum dissolved in a solvent, such as the standard solutions previously mentioned from which the standard spots were prepared. In this connection, it is only necessary to calibrate the instrument by testing standard solutions having a known petroleum oil concentration and following such calibration the amount of oil in an unknown solution can be readily determined.

The oil content found in accordance with the above methods is expressed as parts per million of the solid residue of the drilling fluid, or, if desired, the said oil content can be expressed as parts per million of the drilling fluid since the percentage solid residue of the drilling fluid is known.

In describing the foregoing methods, the drilling fluid entering the well was selected for illustration and the sample on which the tests were conducted was obtained from this fluid. For the comparison contemplated by the invention it will be necessary to repeat the analytical procedure in connection with the drilling fluid discharged from the well, thereby permitting a comparison of the oil content of said fluids. Comparing the data thus obtained will indicate the penetration of an oil-bearing horizon in those instances where the oil content of the drilling fluid discharged from the well shows a material increase over the oil content of the fluid entering the well. The use of the extraction process of the method whereby the oil is extracted from the substantially dry solid residue eliminates any possibility of error in the determination of the oil content due to the presence in the drilling fluids of material other than oil capable of fluorescing under ultra-violet light. This is due to the fact that this material remains in the solid residue since only the oil is extracted by the oil solvent used for this process.

In the preferable practice of the invention, the samples taken of the drilling fluids entering and leaving a well represent approximately the same fluid. In order that the sample taken of the drilling fluid leaving the well will correspond to the fluid entering, a certain time factor must be considered based on the depth of the well, the size of the hole, and the speed of pumping. These factors determine the flow of the fluid into the well and back to the surface again. Therefore, the sample of the discharged fluid is taken following a lapse of time, based on the above given factors, so that the extracts from the solid residues of the samples will represent approximately the same drilling fluid.

The invention as hereinabove set forth may be variously embodied within the scope of the following claims.

What is claimed is:

1. The method of exploring for oil, which consists in obtaining a sample of the drilling fluid entering a well and another sample of approximately the same drilling fluid leaving the well, evaporating separately portions of both samples to dryness to obtain in each case a substantially dry solid residue, extracting the oil from the solid residues, respectively, by means of a solvent, comparing the fluorescence of each extract thus obtained under ultra-violet light with standard solutions wherein the oil concentration is known, said comparison being based on the premise that the oil concentration of an extract will approximate the oil concentration of a particular standard solution having substantially the same fluorescence, expressing the results as parts per million of oil of the respective solid residues, comparing the data thus obtained and noting any material increase in the oil content of the solid residue of the drilling fluid leaving the well in contrast to the oil content of the solid residue of the fluid entering the well, to thereby detect the penetration of an oil-bearing horizon.

2. The method of exploring for oil substantially as set forth in claim 1, except that the results obtained in determining the oil content of the respective extracts are expressed in parts per million of the respective drilling fluids, and therein comparing the data thus obtained and noting any material increase in the oil content of the drilling fluid leaving the well in contrast to the oil content of the fluid entering the well, to thereby detect the penetration of an oil-bearing horizon.

3. In a method of exploring for oil, which consists in determining the oil content of the solid residues, respectively, of approximately the same drilling fluid entering a well and leaving said well by extracting the oil from said solid residues, subjecting each extract as a unit to ultra-violet light to cause the oil content thereof to fluoresce, the intensity of the fluorescence of said extracts being in direct proportion to their oil content, comparing the oil content of said solid residues and noting any increase in the oil content of the solid residue of the drilling fluid leaving the well in contrast to the oil content of the solid residue of the fluid entering the well, to thereby detect the penetration of an oil-bearing horizon.

JOHN G. CAMPBELL.

CERTIFICATE OF CORRECTION.

Patent No. 2,297,939.                      October 6, 1942.

JOHN G. CAMPBELL.

It is hereby certified that error appears in the printed specification of the above numbered patent requiring correction as follows: Page 2, first column, line 31, for "from 0.1" read --from .01--; and that the said Letters Patent should be read with this correction therein that the same may conform to the record of the case in the Patent Office.

Signed and sealed this 24th day of November, A. D. 1942.

Henry Van Arsdale, (Seal)                         Acting Commissioner of Patents.